United States Patent
Papandreou

[11] Patent Number: 6,142,504
[45] Date of Patent: Nov. 7, 2000

[54] STEERING WHEEL AND AIR BAG ASSEMBLY ATTACHMENT TO A STEERING SHAFT

[75] Inventor: John P. Papandreou, Medford, N.Y.

[73] Assignee: TRW Inc., Lyndhurst, Ohio

[21] Appl. No.: 08/909,215

[22] Filed: Aug. 11, 1997

Related U.S. Application Data

[60] Provisional application No. 60/029,498, Oct. 29, 1996.

[51] Int. Cl.[7] .................................................. B60R 21/16
[52] U.S. Cl. ........................................ 280/728.2; 280/731
[58] Field of Search ................................ 280/728.2, 731; 74/552

[56] References Cited

U.S. PATENT DOCUMENTS

| | | |
|---|---|---|
| 5,144,861 | 9/1992 | Nishijima et al. . |
| 5,431,438 | 7/1995 | Manabe . |
| 5,470,099 | 11/1995 | Williams ............................. 280/728.2 |
| 5,553,888 | 9/1996 | Turner et al. . |
| 5,570,901 | 11/1996 | Fyrainer . |
| 5,584,501 | 12/1996 | Walters . |
| 5,584,503 | 12/1996 | Lutz ..................................... 280/731 |
| 5,615,910 | 4/1997 | Margetak et al. . |
| 5,685,559 | 11/1997 | Cuevas ............................... 280/728.2 |
| 5,692,769 | 12/1997 | Scharboneau et al. ............ 280/728.2 |
| 5,692,770 | 12/1997 | Scharboneau et al. ............ 280/728.2 |
| 5,716,068 | 2/1998 | Sahara et al. ...................... 280/728.2 |
| 5,720,494 | 2/1998 | Hosoi et al. ....................... 280/728.2 |
| 5,741,025 | 4/1998 | Meyer et al. ...................... 280/728.2 |
| 5,749,598 | 5/1998 | Exner et al. . |
| 5,765,861 | 6/1998 | Ricks et al. ........................ 280/731 |
| 5,806,883 | 9/1998 | Cuevas ............................... 280/728.2 |
| 5,878,629 | 3/1999 | Nagata et al. ..................... 74/552 |

FOREIGN PATENT DOCUMENTS

| | | |
|---|---|---|
| 0728652 | 8/1996 | European Pat. Off. . |
| 29516623 | 3/1996 | Germany . |

*Primary Examiner*—Paul N. Dickson
*Attorney, Agent, or Firm*—Tarolli, Sundheim, Covell, Tummino & Szabo L.L.P.

[57] ABSTRACT

An assembly is provided for mounting on a vehicle steering shaft which rotates about an axis to steer the vehicle and which has a threaded end portion. The assembly includes a steering wheel armature (10), a hub (34) fixedly connected to the steering wheel armature (10) and for non-rotatable attachment to the steering shaft, an inflatable vehicle occupant restraint (50), an inflator (15) for providing inflation fluid for inflating the vehicle occupant restraint (50), a frame (24) supporting the vehicle occupant restraint (50) and the inflator (15) on the steering wheel armature (10), and a cover (39) covering the steering wheel armature (10), the vehicle occupant restraint (50), and the inflator (15). A rotatable fastener (30), when rotated, axially forces the assembly onto the steering shaft with the hub (34) non-rotatably attached to the steering shaft. The fastener (30) has a first portion (33) for threaded engagement with the threaded end portion of the steering shaft and is movable axially toward the steering shaft due to the threaded engagement when rotated in one direction. The hub (34) has a surface (34a) for supporting said fastener (30) for rotation relative to the assembly. The fastener (30) includes a second driven gear portion (32) fixed to the first portion (33).

12 Claims, 6 Drawing Sheets

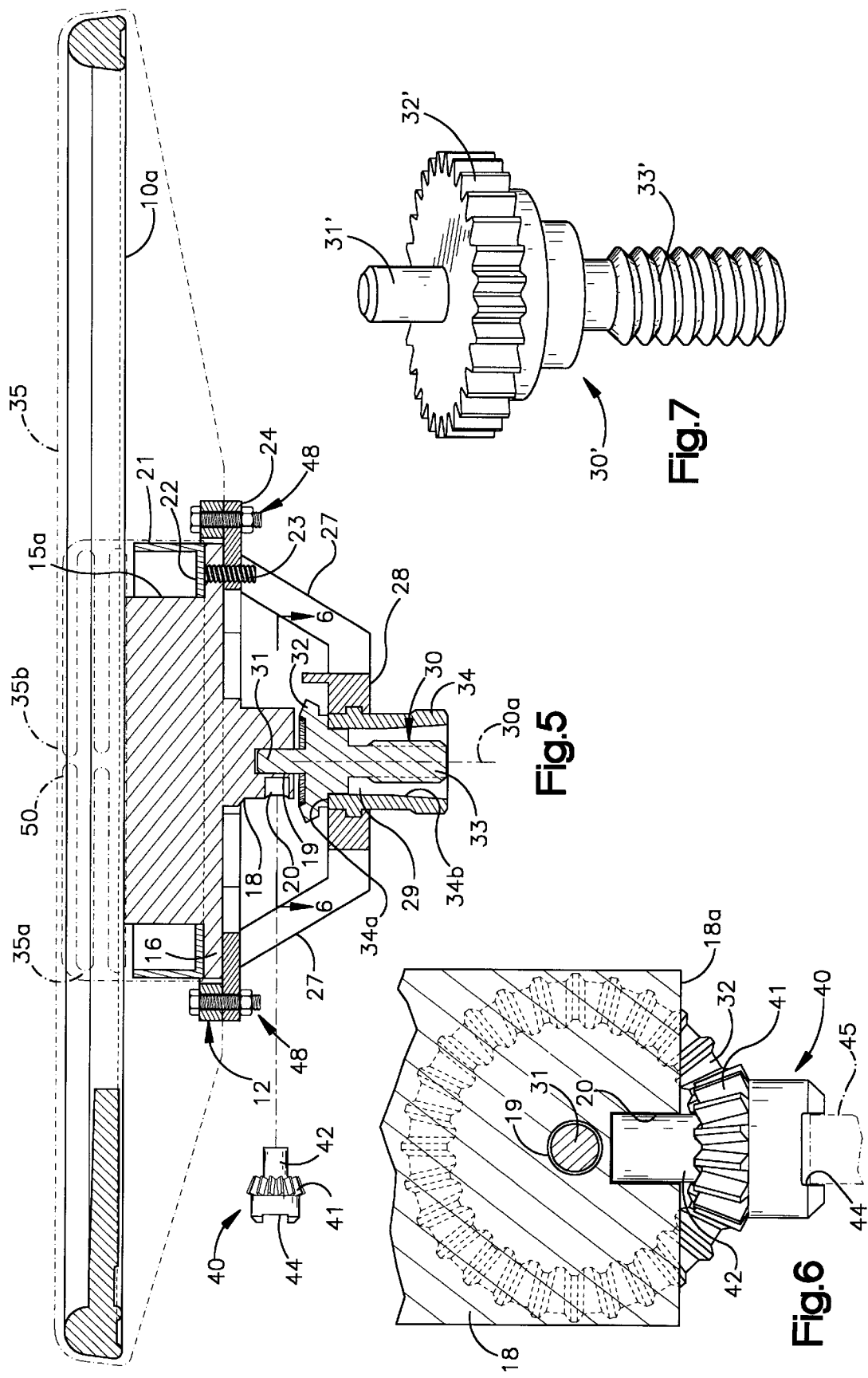

6,142,504

STEERING WHEEL AND AIR BAG ASSEMBLY ATTACHMENT TO A STEERING SHAFT

RELATED APPLICATION

This application claims priority from United States provisional patent application Ser. No. 60/029,498, filed Oct. 29, 1996, entitled "Means for Attaching a Pre-assembled or Integral Steering Wheel Assembly onto the Steering Column Shaft Using Conventional Coupling Means".

FIELD OF THE INVENTION

The present invention relates to the attachment of a steering wheel and air bag assembly to a steering shaft of a vehicle. More particularly, the present invention relates to the attachment of a steering wheel and air bag assembly to a steering shaft of a vehicle that permits the entire assembly to be assembled prior to attachment to the steering shaft.

BACKGROUND OF THE INVENTION

A typical assembly process for a vehicle steering wheel having a driver's side air bag involves a series of sequential steps. For example, a steering wheel is first attached to a steering shaft using a fastener which is accessed and tightened in a center area of the steering wheel. Next, an air bag module is placed in the center area of the steering wheel and secured thereto.

This process, however, does not work with a steering wheel and air bag assembly having a one-piece integral cover on the steering wheel and covering the air bag.

SUMMARY OF THE INVENTION

The present invention is an apparatus comprising an assembly to be mounted on a vehicle steering shaft which rotates about an axis to steer the vehicle and which has a threaded end portion. The assembly comprises a steering wheel armature, a hub fixedly connected to the steering wheel armature and for non-rotatable attachment to the steering shaft, an inflatable vehicle occupant restraint, an inflator for providing inflation fluid for inflating the vehicle occupant restraint, support means supporting the vehicle occupant restraint and the inflator on the steering wheel armature, and cover means covering the steering wheel armature, the vehicle occupant restraint, and the inflator. A rotatable fastener axially forces the assembly onto the steering shaft with the hub non-rotatably attached to the steering shaft. The fastener has a first portion for threaded engagement with the threaded end portion of the steering shaft, and the fastener is movable axially toward the steering shaft due to the threaded engagement when rotated in one direction. As the fastener moves axially toward the steering shaft, the fastener forces the hub onto the steering shaft.

The assembly has means supporting the fastener on the assembly for rotation relative to the assembly. The fastener includes a second driven gear portion fixed to the first portion. The assembly includes means providing an access opening for receiving a driving tool for rotating the second driven gear portion of the fastener thereby rotating the first portion of the fastener.

BRIEF DESCRIPTION OF THE DRAWINGS

Further features of the present invention will become apparent from the ensuing description when considered together with the accompanying drawings wherein:

FIG. 5 is a schematic sectional view of parts of the present invention;

FIG. 6 is a partial sectional view taken approximately along lines 6—6 of FIG. 5 and showing a tool for fastening the steering wheel and air bag assembly to a steering shaft;

FIG. 7 is a perspective view of an alternate embodiment of the present invention;

DESCRIPTION OF A PREFERRED EMBODIMENT

Figure 1:
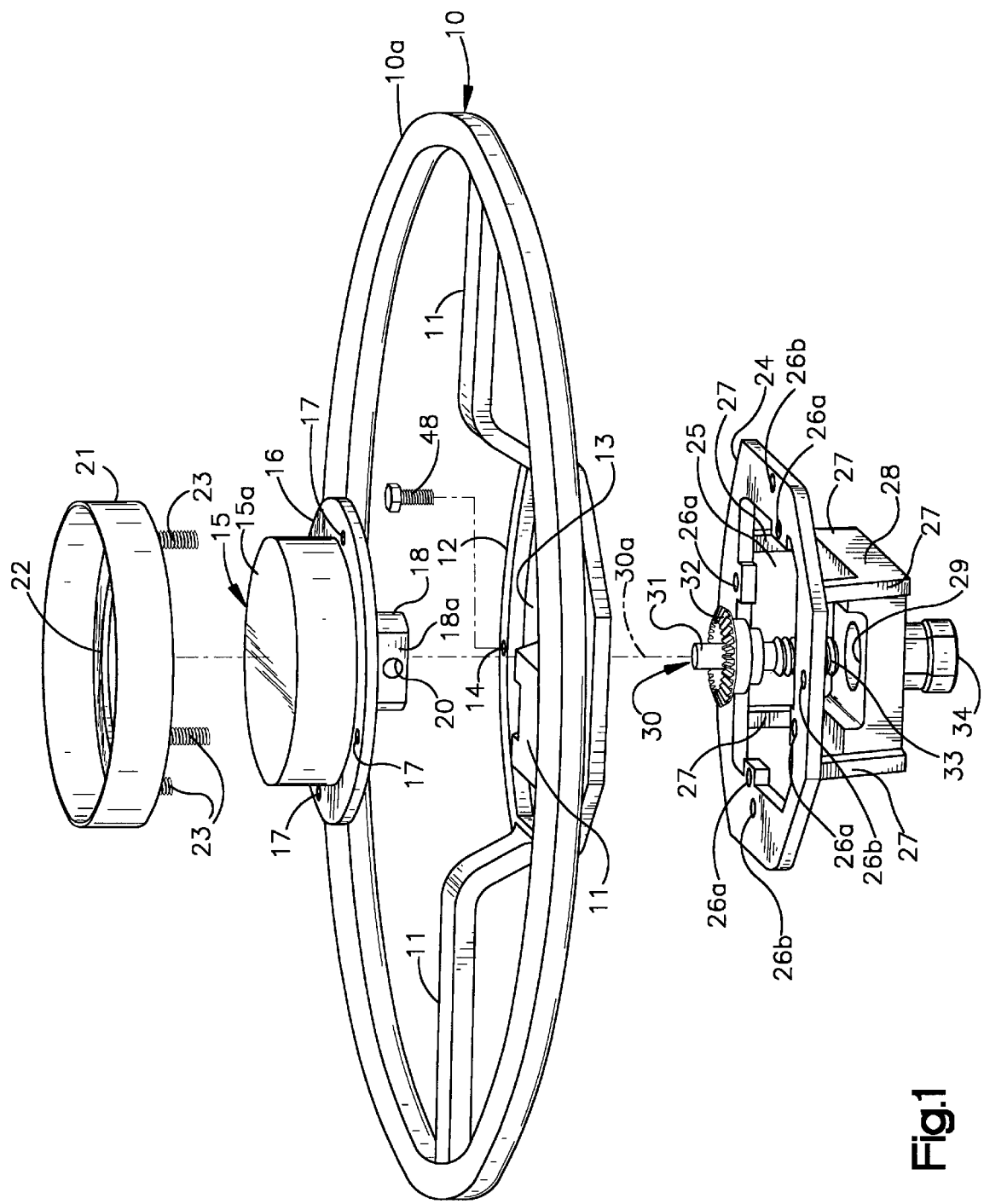
FIG. 1 is an exploded perspective view of a steering wheel and air bag assembly according to the present invention.
Figure 2:
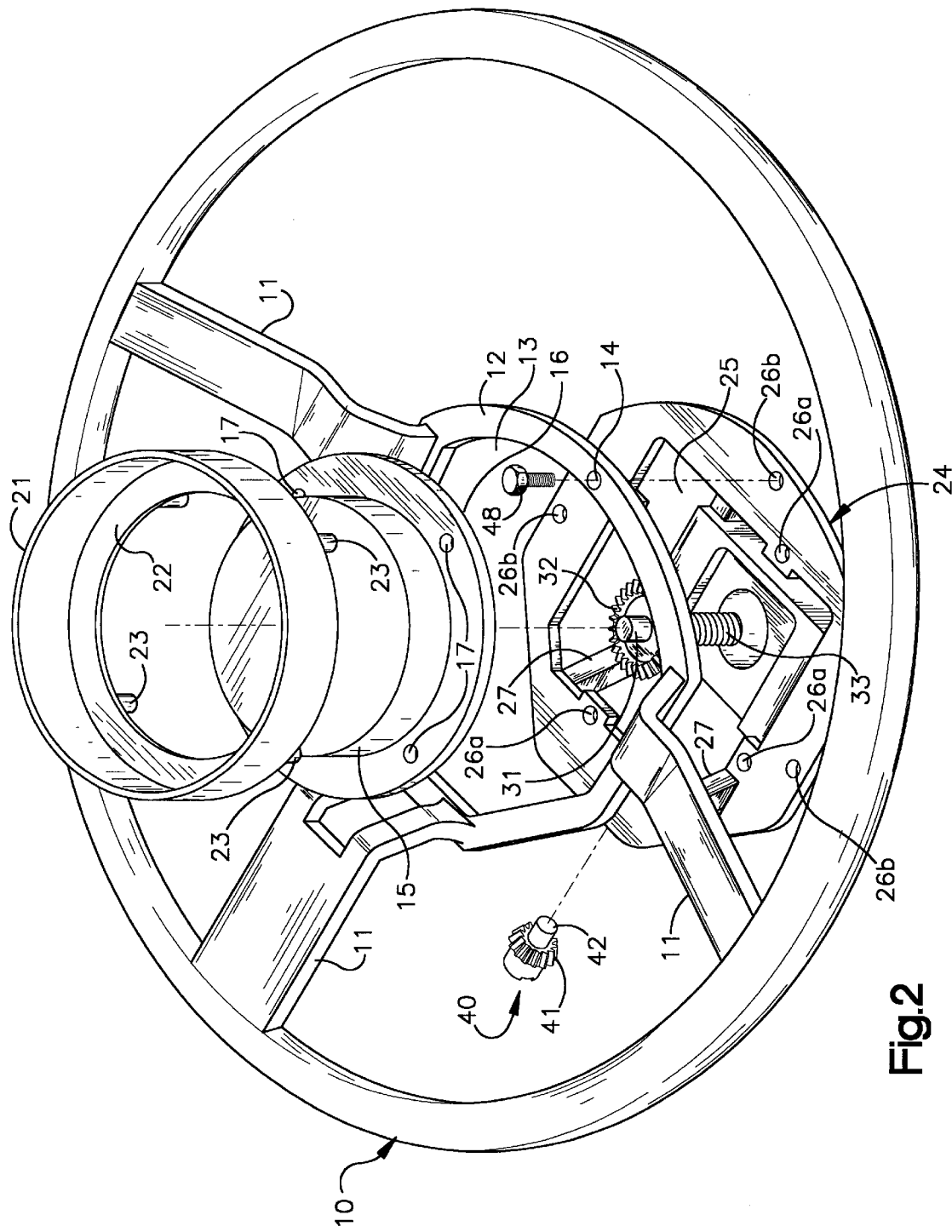
FIG. 2 is an exploded perspective view looking from below the steering wheel and air bag assembly shown in FIG. 1.

With reference to the various figures wherein like reference numerals identify like parts, FIG. 1 illustrates a steering wheel and air bag assembly according the present invention which includes a die cast steering wheel armature 10 having a rim 10a, a plurality of inwardly disposed radial arms (or spokes) 11, and an upper frame 12. The upper frame 12 is fixedly connected to the rim 10a by the spokes 11. The upper frame 12 has a central opening 13 defined therein and is provided with a plurality of spaced apertures 14 about its periphery for receiving a plurality of fasteners 48.

Figure 3:
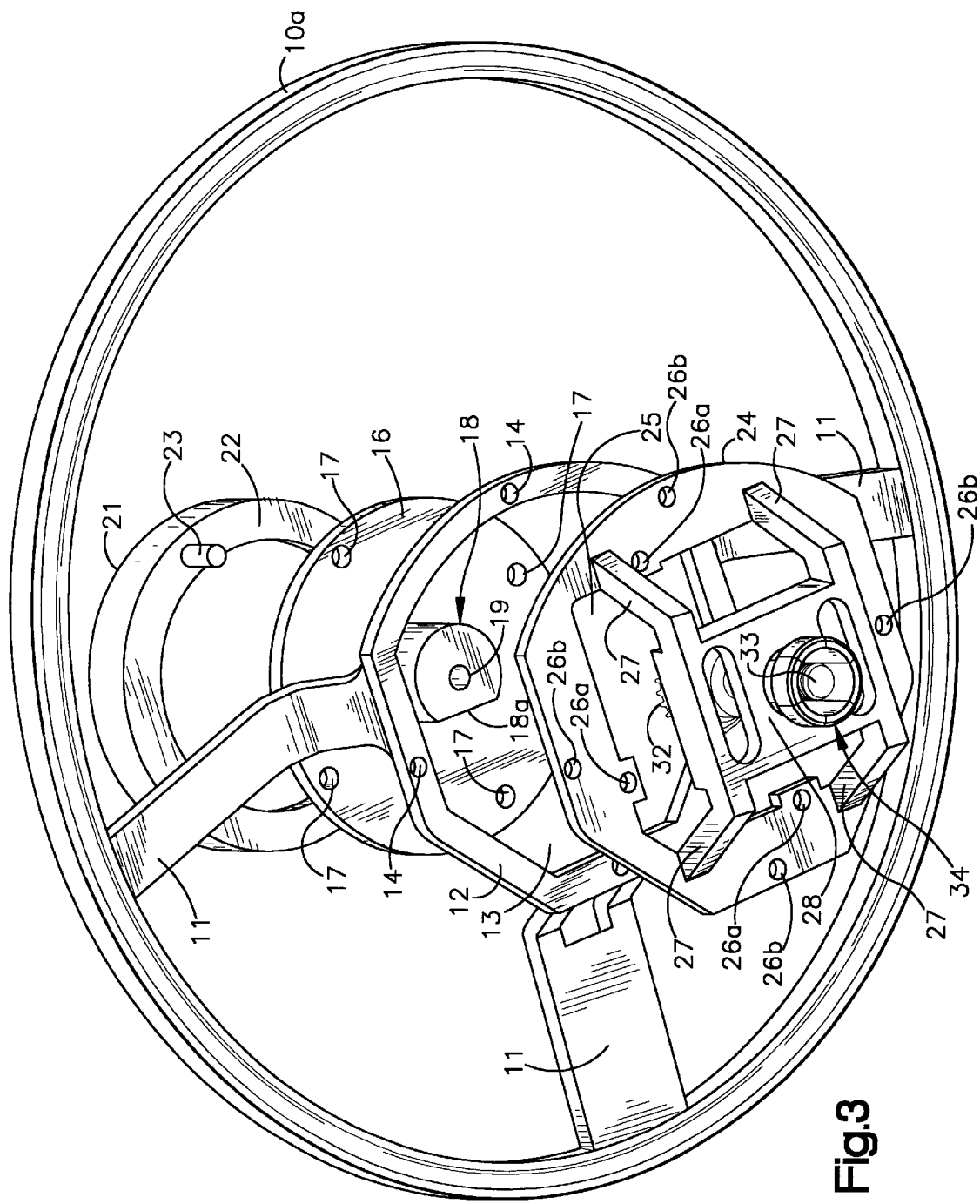
FIG. 3 is an exploded perspective view looking from above the steering wheel and air bag assembly shown in FIG. 1.

An air bag inflator 15 (FIG. 1) provides inflation fluid to inflate an inflatable vehicle occupant restraint or air bag 50 (shown schematically in FIG. 5). The inflator 15 has a cylindrical housing 15a. The bottom of the inflator housing 15a has an outwardly extending flange 16 with a plurality of circumferentially spaced apertures 17 formed therein. A centrally positioned guide portion 18 extends downwardly from the inflator housing 15a. The guide portion 18 can be formed integrally with the housing 15a or as a separate part. The guide portion 18 is in the form of a ¾ cylinder; i.e., the outer perimeter of the guide portion 18 has a flattened surface portion as indicated at 18a. The guide portion 18 has a centrally located axially extending bore 19 (FIGS. 3 and 5) and a transverse bore 20 (FIGS. 1 and 5) formed therein. The transverse bore 20 does not intersect the axial bore 19.

An air bag retainer 21 secures the air bag 50 to the inflator housing 15a. The retainer 21 has an inwardly extending, circumferential flange 22 at its lower end and a plurality of downwardly extending, circumferentially spaced studs 23 which are positioned to be received through openings (not shown) in the air bag 50 and then also through the apertures 17 in the flange 16 of the inflator housing 15a. The air bag 50 is thus retained by being clamped between the inflator flange 16 and the retainer flange 22, with the retainer 21 being disposed inside the air bag.

An integral cover 35, shown schematically in FIG. 5, is molded about the steering wheel armature 10. In particular, the cover 35 covers the rim 10a, spokes 11 and the perimeter of the upper frame 12. The cover 35 defines a chamber 35a in which the air bag 50 and the inflator 15 are located. The cover 35 has an upper continuous surface 35b which extends uninterruptedly over the air bag 50, the inflator 15, and the steering wheel armature 10. Thus, the cover 35 covers the inflator 15 and the air bag 50 as well as the armature 10. In accordance with the preferred embodiment of the invention, the cover 35 is made of a urethane material. It is contemplated that the cover 35 could be made from several cover portions rather than the one-piece cover shown. For example, an alternate cover could include a first cover portion covering the steering wheel rim 10a and a second detachable cover portion covering the air bag 50.

The steering wheel and air bag assembly includes a lower frame 24 having a central opening 25 defined therein and a plurality of spaced apertures 26a formed about its periphery for receiving the studs 23 therethrough. The lower frame 24 also has a plurality of spaced apertures 26b for receiving the fasteners 48 to connect the lower frame to the upper frame 12. The lower frame 24 further includes a plurality of depending legs 27 which support a generally rectangular sub-frame 28.

A tubular-shaped hub 34 is fixedly connected to the lower frame 24 and includes a central passage 29 to receive a portion of a rotatable fastener 30 described below. The hub 34 includes an upper surface 34a which extends radially from the central passage 29. An inner surface 34b of the hub 34 is partially tapered, as may be seen in FIG. 5, for receiving a tapered outer surface on one end of a vehicle steering shaft (not shown).

The rotatable fastener 30 (FIG. 5) comprises a first end portion 31, a bevel gear portion 32, and a second end portion 33. The bevel gear portion 32 is intermediate the first and second end portions 31, 33. The first end portion 31, the bevel gear portion 32, and the threaded second end portion 33 of the fastener 30 are fixed together and rotate together. Preferably, the fastener 30 is made from one piece of a metallic material.

The second end portion 33 of the fastener 30 is externally threaded and screws into an internally threaded opening in the tapered end of the steering shaft. The fastener 30 is rotatable about its axis 30a which is coaxial with the axis of rotation of the vehicle steering shaft.

The fastener 30 rests on and is supported for rotation by the upper surface 34a of the hub 34. The first end portion 31 of the fastener 30 is located and rotatable in the axial bore 19 in the guide portion 18. The second end portion 33 of the fastener 30 extends into the passage 29 in the hub 34, and terminates approximately in the plane in which the hub 34 terminates.

Figure 4:
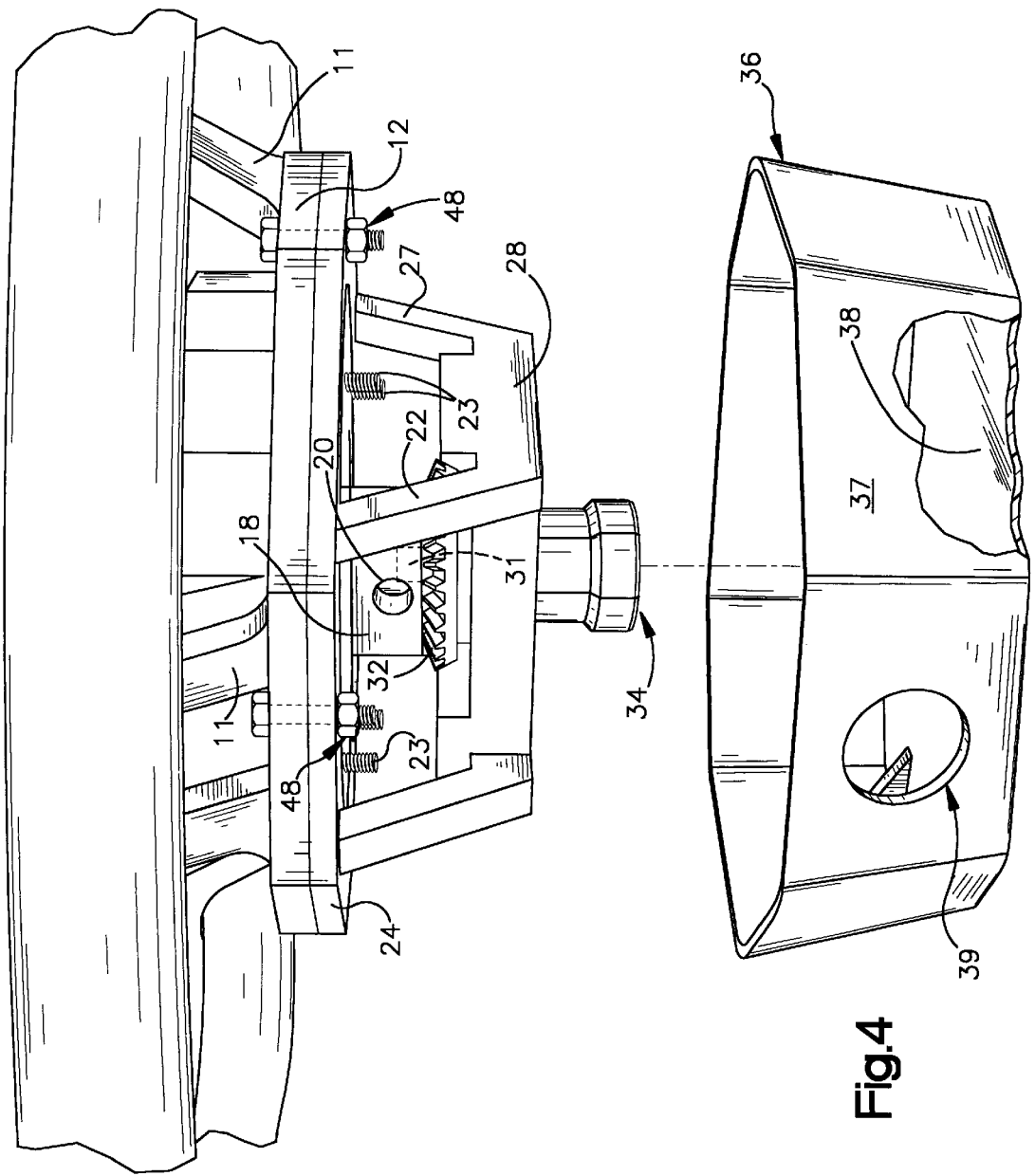
FIG. 4 is an exploded perspective view illustrating further parts of the present invention.

A lower cover 36 which covers the lower frame 24 is illustrated in FIG. 4. The lower cover 36 can be constructed to have a single, circular side wall or a plurality of contiguous, angularly joined panels forming the side wall 37 and a bottom wall 38. An opening 39 in the side wall 37 serves as an access means to facilitate entry within the lower cover 36 to position and engage or disengage and remove a driving tool 40 to be described later without the need to remove the lower cover 36. An aperture (not shown) is provided in the center of the bottom wall 38 to accommodate the extension of the hub 34 therethrough.

The assembly of the aforementioned parts includes locating the fastener 30 on the upper surface 34a of the hub 34. Then, studs 23 are positioned through the apertures (not shown) in the air bag 50, through the apertures 17 in the inflator flange 16, and through the apertures 26a in the lower frame 24 while guiding the first end portion 31 of the fastener 30 into the axial bore 19 in the guide portion 18. Nuts (not shown) are threaded onto the ends of the studs 23 to secure the retainer 21, the air bag 50 and the inflator 15 to the lower frame 24.

The upper frame 12 of the steering wheel armature 10 is then attached to the lower frame 24 by the fasteners 48 which extend through the apertures 14 in the upper frame 12 and the apertures 26b in the lower frame 24. Next, the bottom cover 36 is secured by fasteners (not shown) to the lower frame 24 so that the hub 34 extends beyond the planar surface of the bottom wall 38 of the bottom cover 36 and the access port 39 in the side wall 37 of the bottom cover 36 is approximately aligned with the bevel gear portion 32 of the fastener 30. The steering wheel and air bag assembly is then complete and is thus ready to be secured to the steering shaft.

The steering wheel and air bag assembly is secured to the steering shaft by first locating the hub 34 coaxial with the steering shaft. When so located, the threaded second end portion 33 of the fastener 30 is aligned with the internally threaded opening in the end of the steering shaft.

A driving tool 40 for rotating the fastener is now inserted through the access opening 39 in the lower cover 36. The driving tool 40 (FIG. 6) comprises a bevel gear portion 41, a shaft portion 42 and a socket 44 for receiving a bit 45 from a conventional power driven tool.

During assembly, the shaft portion 42 of the driving tool 40 is inserted into and received by the transverse bore 20 in the guide portion 18 to locate the tool 40. The gear portion 41 of the driving tool is located in meshing engagement with the gear portion 32 of the fastener 30. Rotation of the gear portion 41 of the driving tool 40 causes the fastener 30 to rotate in a tightening direction and to become screwed into the internally threaded opening in the end of the vehicle steering shaft. The rotation of the fastener 30 in the tightening direction moves the fastener axially toward the steering shaft, thereby forcing the steering wheel and air bag assembly downward relative to the steering shaft as viewed in FIG. 5. As the steering wheel assembly is forced downward relative to the steering shaft, the tapered surfaces on the hub 34 and on the steering shaft are pressed together to secure the steering wheel and air bag assembly to the steering shaft. In addition, complimentary flats (not shown) on the hub 34 and on the steering shaft provide an alignment of the steering wheel air bag assembly on the steering shaft as well as a means for transmitting torque from the steering wheel to the steering shaft.

Torque which is produced by turning the steering wheel (i.e., steering the vehicle) is transmitted through the spokes 11 to the interconnected upper and lower frames 12 and 24, to the hub 34 which is fixed to the lower frame 24, and from the hub 34 to the steering shaft.

The description above relates to attaching the steering wheel and air bag assembly to the steering shaft of a vehicle by rotation of the fastener 30 in a tightening direction. After the steering wheel and air bag assembly is secured to the steering shaft by the fastener 30, it can be removed from the steering shaft by rotation of the fastener 30 in an untightening direction opposite the tightening direction of rotation. Rotation in the untightening direction causes the fastener 30 to move axially and relatively away from the steering shaft. The top end of the first end portion 31 of the fastener 30 will abut against a facing surface of the axial bore 19 in the guide portion 18. This will apply an upward force on the steering wheel and air bag assembly and, particularly the hub 34, causing disengagement of the hub 34 and steering shaft and permitting removal of the steering wheel and air bag assembly from the steering shaft.

Figure 8:
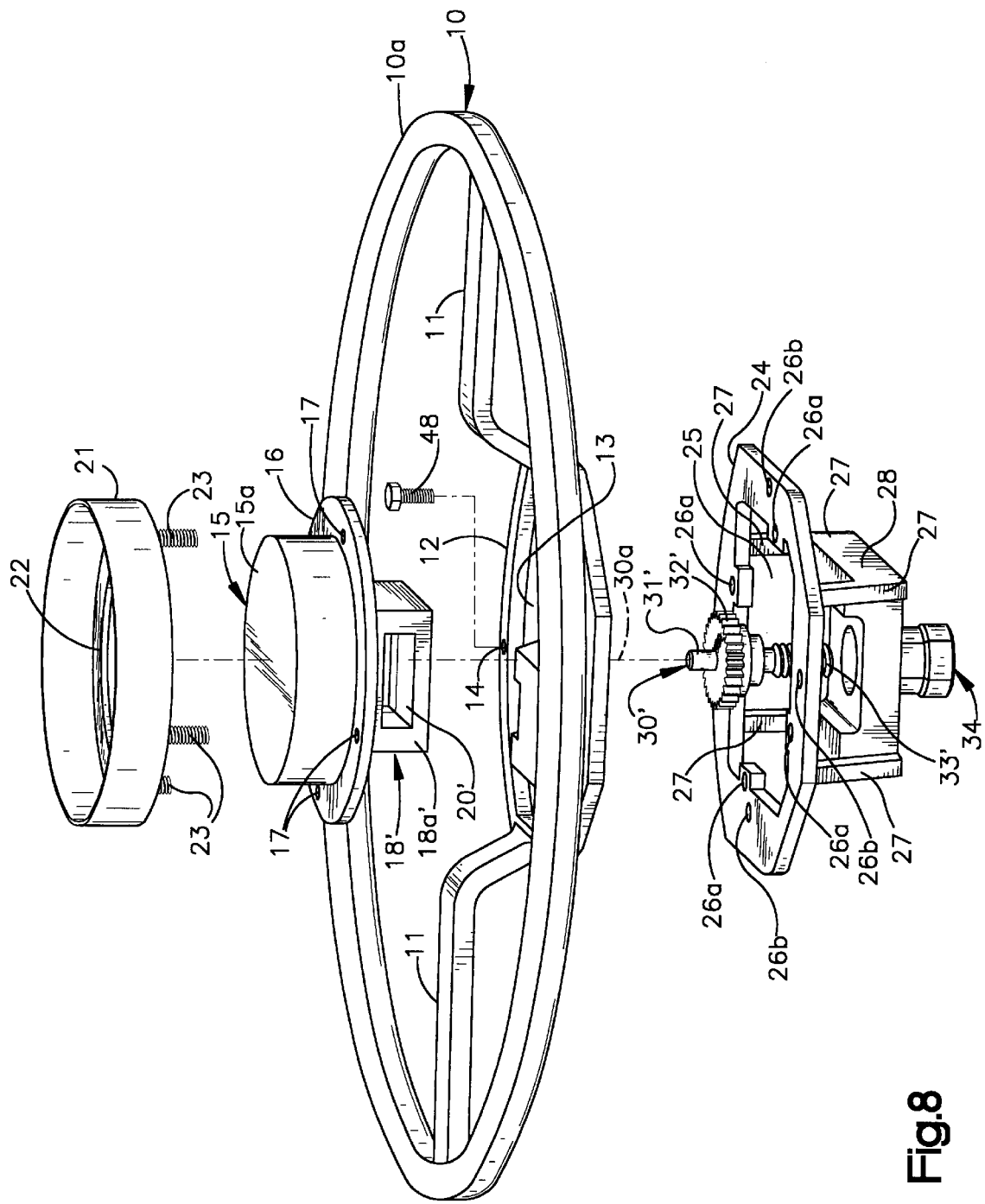
FIG. 8 is a view similar to FIG. 1 showing an alternate construction of the steering wheel assembly in accordance with the alternate embodiment of FIG. 7.

FIGS. 7 and 8 illustrate an alternate embodiment of the present invention. In the embodiment of FIGS. 7 and 8, similar structure to that of the previous embodiment is identified with the same reference numerals, but with a prime added. A fastener 30' illustrated in FIG. 7, is substantially similar to the fastener 30 described above, except that the fastener 30' has a spur gear portion 32' which is driven by an associated tool to secure the steering wheel and air bag assembly to the steering shaft, rather than the bevel gear design described above.

As may be seen in FIG. 8, the configuration of the guide portion 18' in the alternate embodiment is different than that of the guide portion 18 in the previous embodiment. The guide portion 18' has a chamber 20' to receive the end of a spur gear driving tool (not shown) which has a rectangular shape and from which a spur gear protrudes for meshing with the spur gear portion 32' of the fastener 30'.

The chamber 20' has a rectangular shape closely corresponding to the rectangular shape of the end of the driving tool. The chamber 20' intersects the wall 18*a*' of the guide portion 18'. The chamber 20' is dimensioned to closely receive the spur gear driving tool to locate the tool relative to the gear portion 32'. Lateral walls of the guide portion 18' resist movement of the tool in the chamber 20' including when the tool is driving the gear portion 32' of the fastener 30'.

Although the invention has been described with particularity and in some detail, it will be appreciated by those skilled in the art that changes and modifications can be made therein without departing from the scope and spirit of the claimed invention.

Having described the invention, I claim:

1. An apparatus for mounting on a vehicle steering shaft which rotates about an axis to steer the vehicle and which has a threaded end portion, said apparatus comprising:

an assembly comprising:

a steering wheel armature;

a hub fixedly connected to said steering wheel armature and for non-rotatable attachment to the steering shaft;

an inflatable vehicle occupant restraint;

an inflator for providing inflation fluid for inflating said vehicle occupant restraint, said inflator having a housing and a guide portion, said guide portion being formed integrally with said housing and extending downwardly from said housing toward said hub;

support means for supporting said vehicle occupant restraint and said inflator on said steering wheel armature; and cover means for covering said steering wheel armature, said vehicle occupant restraint, and said inflator; and a rotatable fastener for axially forcing said assembly onto the steering shaft with said hub non-rotatably attached to the steering shaft, said fastener having a first portion for threaded engagement with the threaded end portion of the steering shaft and being movable axially toward the steering shaft due to the threaded engagement when rotated in one direction, said fastener including a second driven gear portion fixed to said first portion;

said assembly having means for supporting said fastener on said assembly for rotation relative to said assembly;

said guide portion of said inflator having an axial bore which receives a portion of said fastener and a transverse bore for receiving a portion of a driving tool for rotating said second driven gear portion of said fastener.

2. An apparatus as set forth in claim 1 wherein said transverse bore in said guide portion of said inflator does not intersect said axial bore in said guide portion.

3. An apparatus as set forth in claim 1 wherein said transverse bore comprises a rectangular chamber having parallel lateral walls for supporting lateral sides of the driving tool to resist movement of the driving tool when the driving tool is rotating said fastener.

4. An apparatus as set forth in claim 1 wherein said driven portion of said fastener is located axially between said guide portion and said hub.

5. An apparatus as set forth in claim 4 wherein said transverse bore in said guide portion is positioned for receiving an end portion of the driving tool to locate an adjacent gear portion of the driving tool for meshing engagement with said second driven gear portion of said fastener.

6. An apparatus as set forth in claim 1 wherein said second driven gear portion comprises a bevel gear.

7. An apparatus as set forth in claim 1 wherein said second driven gear portion comprises a spur gear.

8. An apparatus as set forth in claim 1 wherein said assembly includes means for providing an access opening for receiving the driving tool for rotating said second driven gear portion of said fastener to thereby rotate said first portion of said fastener.

9. An apparatus as set forth in claim 8 wherein said steering wheel armature comprises a rim, an upper frame, and a plurality of spokes connecting said rim to said upper frame, said support means for supporting said vehicle occupant restraint and said inflator comprising said upper frame of said steering wheel armature.

10. An apparatus as set forth in claim 9 wherein said assembly further includes a lower frame connecting said hub to said upper frame and a lower cover for covering said lower frame, said means for providing an access opening being located in a side wall of said lower cover.

11. An apparatus as set forth in claim 1 wherein said cover means for covering said steering wheel armature, said vehicle occupant restraint and said inflator comprises an integral cover.

12. An apparatus as set forth in claim 11 wherein said integral cover comprises an urethane material having a continuous outer surface extending uninterrupted over said steering wheel armature, said vehicle occupant restraint, and said inflator.

* * * * *